US010181271B1

(12) United States Patent
Valenti, Jr. et al.

(10) Patent No.: US 10,181,271 B1
(45) Date of Patent: Jan. 15, 2019

(54) FOLDUNDER LABEL

(71) Applicant: Chicago Tag & Label, Inc., Libertyville, IL (US)

(72) Inventors: F. Paul Valenti, Jr., Barrington, IL (US); Carl Opel, Carol Stream, IL (US); Daniel Hedger, Grayslake, IL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 0 days.

(21) Appl. No.: 16/037,654

(22) Filed: Jul. 17, 2018

Related U.S. Application Data

(60) Provisional application No. 62/533,941, filed on Jul. 18, 2017.

(51) Int. Cl.
*G09F 3/02* (2006.01)
*G09F 3/10* (2006.01)
*B32B 7/06* (2006.01)
*B32B 7/12* (2006.01)

(52) U.S. Cl.
CPC .................. *G09F 3/02* (2013.01); *B32B 7/06* (2013.01); *B32B 7/12* (2013.01); *G09F 3/10* (2013.01); *B32B 2250/02* (2013.01); *B32B 2519/00* (2013.01); *G09F 2003/0201* (2013.01); *G09F 2003/0226* (2013.01); *G09F 2003/0269* (2013.01)

(58) Field of Classification Search
CPC ...... G09F 3/02; G09F 3/10; G09F 2003/0201; G09F 2003/0226; G09F 2003/0269; B32B 2519/00
See application file for complete search history.

(56) References Cited

U.S. PATENT DOCUMENTS

| 5,618,600 | A  | * | 4/1997 | Denklau ................... G09F 3/10 428/343 |
| 2002/0106494 | A1 | * | 8/2002 | Roth ...................... B31D 1/021 428/198 |
| 2006/0151098 | A1 | * | 7/2006 | Rutsky ................... B31D 1/021 156/253 |
| 2009/0092781 | A1 | * | 4/2009 | Guzi ........................ B32B 7/06 428/42.3 |
| 2010/0156087 | A1 | * | 6/2010 | Raming ................ G09F 3/0288 283/79 |
| 2010/0293829 | A1 | * | 11/2010 | Miles .................... G09F 3/0288 40/638 |
| 2012/0234481 | A1 | * | 9/2012 | Raming ................ G09F 3/0288 156/249 |

(Continued)

Primary Examiner — Gary C Hoge
(74) Attorney, Agent, or Firm — Ice Miller LLP

(57) ABSTRACT

A foldunder label includes a first label sheet with a top side and an opposing underside and a first label line of weakness defining a central region of the first label sheet; and a second label sheet comprising an upper side and an opposing lower side and a second label line of weakness defining a central portion of the second label sheet; and a carrier material with a first section and a second section separated by a line of demarcation, a first section line of weakness underlying the first label, and a second section line of weakness underlying the second label, wherein the underside of the first label sheet is removably adhered to the first section and the lower side of the second label sheet is removably adhered to the second section.

18 Claims, 9 Drawing Sheets

(56) References Cited

U.S. PATENT DOCUMENTS

| 2013/0249205 A1* | 9/2013 | Bellmyer | B65C 9/00 |
| | | | 283/81 |
| 2014/0117659 A1* | 5/2014 | Raming | B42D 15/006 |
| | | | 283/81 |

* cited by examiner

FOLDUNDER LABEL

RELATED APPLICATION

This application claims the benefit of U.S. Application No. 62/533,941, filed Jul. 18, 2017, the disclosure of which is incorporated herein by reference.

BACKGROUND

Labels are commonly used to secure printed indicia to packages to indicate shipping or other information. In the instance of a shipping use, a separate packing list may be enclosed within a package shipped to the customer containing a purchased item.

There is significant demand for a labeling method that allows printing and application of a lower label and an upper label to a surface. For example, there is significant demand for a labeling method that allows printing and application of a shipping label, a packing list label, and/or a return shipping label to the surface of a sealed carton. Because the carton is sealed prior to packing list generation, it is not efficient to open it to insert a packing list. High volume shipping of such packages requires rapid attachment of a shipping label, a packing list label, and/or a return shipping label to the package. It is preferred to conceal the information of a packing list until the final recipient receives the shipped package.

For the foregoing reasons, it is desired to provide labeling forms and methods that allows printing and application of a shipping label, a packing list label, and/or a return shipping label to the surface of a sealed carton while avoiding the many shortcomings of existing labeling forms and methods.

SUMMARY

The present disclosure includes disclosure of foldunder labels. In at least one embodiment, a foldunder label according to the present disclosure comprises a first label sheet comprising a top side and an opposing underside, the first label sheet comprising a first label line of weakness, the first label line of weakness defining a central region of the first label sheet, the central region having a first area; a second label sheet comprising an upper side and an opposing lower side, the second label sheet comprising a second label line of weakness, the second label line of weakness defining a central portion of the second label sheet, the central portion having a second area, wherein the first area is larger than the second area; and a carrier material comprising a first section and a second section separated by a line of demarcation, wherein the underside of the first label sheet is removably adhered to the first section and the lower side of the second label sheet is removably adhered to the second section, the carrier material further comprising a first section line of weakness underlying the first label, and a second section line of weakness underlying the second label. In an aspect of at least one embodiment of a foldunder label according to the present disclosure, the first section and the second section have substantially the same dimensions. In an aspect of at least one embodiment of a foldunder label according to the present disclosure, the carrier material is foldable at the line of demarcation. In an aspect of at least one embodiment of a foldunder label according to the present disclosure, the second label sheet further comprises a first margin, a second margin, and at least two side margins, the first margin, the second margin, and side margins together forming a second label sheet border, the second label line of weakness being inboard of the second label sheet border, the second label line of weakness dividing the second label sheet into the central portion within the second label line of weakness and a frame portion between the second label line of weakness and the second label sheet border. In an aspect of at least one embodiment of a foldunder label according to the present disclosure, the first label sheet further comprises a first edge, a second edge, and at least two side edges, the first edge, the second edge, and side edges together forming a first label sheet border, the first label line of weakness being inboard of the first label sheet border, the first label line of weakness dividing the first label sheet into the central region within the first label line of weakness and a frame region between the first label line of weakness and the first label sheet border. In an aspect of at least one embodiment of a foldunder label according to the present disclosure, the first section line of weakness is identical in size and shape to the first label line of weakness. In an aspect of at least one embodiment of a foldunder label according to the present disclosure, the first section line of weakness is in registration with the first label line of weakness. In an aspect of at least one embodiment of a foldunder label according to the present disclosure, the first section line of weakness is identical in size and shape to the second section line of weakness. In an aspect of at least one embodiment of a foldunder label according to the present disclosure, the first section line of weakness, the second section line of weakness, and the first label line of weakness all are identical in size and shape.

The present disclosure includes disclosure of methods of assembling foldunder labels. In at least one embodiment, a method of assembling a foldunder label, the method comprising the steps of providing an unassembled foldunder label, the unassembled foldunder label comprising a first label sheet comprising a top side and an opposing underside, the first label sheet comprising a first label line of weakness, the first label line of weakness defining a central region of the first label sheet, a second label sheet comprising an upper side and an opposing lower side, the second label sheet comprising a second label line of weakness, the second label line of weakness defining a central portion of the second label sheet, and a carrier material comprising a first section and a second section separated by a line of demarcation, wherein the underside of the first label sheet is removably adhered to the first section and the lower side of the second label sheet is removably adhered to the second section, the carrier material further comprising a first section line of weakness underlying the first label, the first section line of weakness dividing the first section into a central zone within the first section line of weakness and a frame zone outside of the first section line of weakness, and a second section line of weakness underlying the second label, the second section line of weakness dividing the second section into a central part within the second section line of weakness and a frame part outside of the second section line of weakness; removing the central zone of the first section, thereby exposing an adhesive on the underside of the first label sheet; folding the carrier material at the line of demarcation; adhering the exposed adhesive of the underside of the first label sheet to the central part of the second section; and removing the first label from the folded carrier material to expose the adhesive on the frame zone of the underside of the first label.

In at least one embodiment, a foldunder label according to the present disclosure comprises a first label sheet comprising a top side and an opposing underside, the first label sheet comprising a first label line of weakness, the first label line of weakness defining a central region of the first label sheet;

a second label sheet comprising an upper side and an opposing lower side, the second label sheet comprising a second label line of weakness, the second label line of weakness defining a central portion of the second label sheet; and a carrier material comprising a first section and a second section separated by a line of demarcation, wherein the underside of the first label sheet is removably adhered to the first section and the lower side of the second label sheet is removably adhered to the second section, the first section comprising a frame zone defining an open central zone within the frame zone, the underside of the first label overlying at least a portion of the open central zone and at least a portion of the frame zone, the second section comprising a second section line of weakness underlying the second label, the second section line of weakness dividing the second section into a central part within the second section line of weakness and a frame part outside of the second section line of weakness, the carrier material folded at the line of demarcation so that at least a segment of the underside of the first label sheet overlying the open central zone is adjacent to the central part of the second section. In an aspect of at least one embodiment of a foldunder label according to the present disclosure, the first section and the second section have substantially the same dimensions. In an aspect of at least one embodiment of a foldunder label according to the present disclosure, the second label sheet further comprises a first margin, a second margin, and at least two side margins, the first margin, the second margin, and side margins together forming a second label sheet border, the second label line of weakness being inboard of the second label sheet border, the second label line of weakness dividing the second label sheet into the central portion within the second label line of weakness and a frame portion between the second label line of weakness and the second label sheet border. In an aspect of at least one embodiment of a foldunder label according to the present disclosure, the first label sheet further comprises a first edge, a second edge, and at least two side edges, the first edge, the second edge, and side edges together forming a first label sheet border, the first label line of weakness being inboard of the first label sheet border, the first label line of weakness dividing the first label sheet into the central region within the first label line of weakness and a frame region between the first label line of weakness and the first label sheet border. In an aspect of at least one embodiment of a foldunder label according to the present disclosure, the central zone of the first label sheet is identical in size and shape to the first label line of weakness. In an aspect of at least one embodiment of a foldunder label according to the present disclosure, the central zone of the first label sheet is in registration with the first label line of weakness. In an aspect of at least one embodiment of a foldunder label according to the present disclosure, the central zone of the first label sheet is identical in size and shape to the second section line of weakness. In an aspect of at least one embodiment of a foldunder label according to the present disclosure, the central zone of the first label sheet, the second section line of weakness, and the first label line of weakness all are identical in size and shape.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein.

DESCRIPTION

Figure 1:
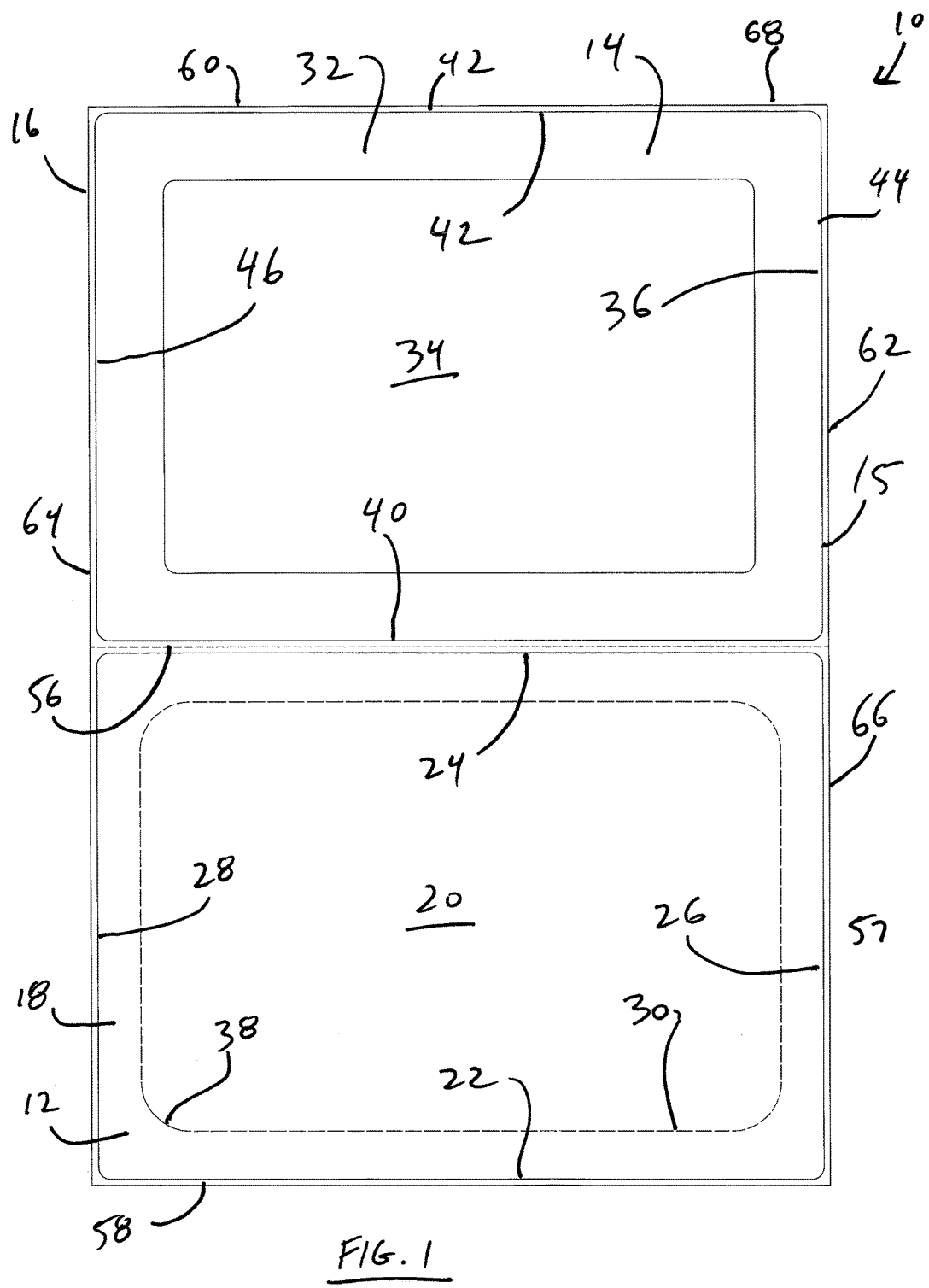
FIG. 1 shows a top view of a foldunder label according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a top view of foldunder label 10 according to at least one embodiment of the present disclosure. As shown in FIG. 10, foldunder label 10 comprises first label 12 and second label 14. In at least one embodiment of the present disclosure, first label 12 and second label 14 comprise a label stock material such as, for example, paper, polyester, or another polymer material. In at least one embodiment of the present disclosure, first label 12 and second label 14 comprise a label stock material receptive to the printing of indicia thereon. For example, first label 12 and second label 14 may be exposed to an ink jet printer, a laser printer, a thermal transfer printer, a direct thermal printer, or another type of printing device capable of applying indicia to first label 12 and second label 14. The inks, toners, and/or other printing materials used in the application of indicia to first label 12 and second label 14 are selected to be compatible with the printing device used to apply such indicia, the material used for first label 12 and second label 14, and the intended use of first label 12 and second label 14. The indicia applied to first label 12 and/or second label 14 may be information such as, for example, shipping and/or return addresses, directions on how to use foldunder label 10, packing list information, business information such as telephone numbers and the name of the business, or the like. Such indicia may include, for example, information explaining the return or exchange policy for a package affixed with a label with the indicia, bar codes, identifying numbers, or maxicodes. In at least one embodiment of the present disclosure, first label 12 may be used as a shipping label and second label 14 may be used as a packing list label and/or a return shipping label.

In at least one embodiment of foldunder label 10 according to the present disclosure, first label 12 and second label 14 are arranged side-by-side on, and are removably adhered to, carrier material 16. In the embodiment of foldunder label 10 shown in FIG. 1, carrier material 16 comprises top surface 57, first boundary 58, second boundary 60, and side boundaries 62, 64. Carrier material 16 is a sheet material selected to be compatible with a removably adhered first label 12 and second label 14, such as, for example, a release-coated or silicone-coated paper material of a type known in the art. Any type of coating material (including no-silicone coatings) that permits the removable adherence of adhesive materials thereto may be used. In the embodiment of foldunder label 10 shown in FIG. 1, top surface 57 comprises such a coating material.

Adhesive 15 is interposed between first label 12 and carrier material 16, and between packing list 14 and carrier material 16. Adhesive 15 is an adhesive material of a type that removably adheres to a coated carrier material, but that also permanently or semi-permanently adheres to other surfaces. For example, adhesive 15 may be a pressure sensitive adhesive.

In the embodiment of foldunder label 10 shown in FIG. 1, first label 12 comprises a top side and an opposing underside (not shown in FIG. 1 but shown in FIG. 2), and is bounded by first edge 22, second edge 24, and side edges 26, 28. Line of weakness 30 (such as, for example, perforations, die cut(s), and/or partial die cut(s)) is cut into first label 12 in a fashion that is inboard of the boundary formed by first edge 22, second edge 24, and side edges 26, 28. Line of weakness 30 does not intersect with any of first edge 22, second edge 24, and side edges 26, 28. Line of weakness 30 also is cut into first label 12 in a fashion that extends only into first label 12, but that does not extend into carrier material 16 underlying first label 12. Line of weakness 30 divides first label 12 into frame region 18, which is outside line of weakness 30 (between line of weakness 30 and first edge 22, second edge 24, and side edges 26, 28), and a central region 20, which is within line of weakness 30. In at least one embodiment of the present disclosure, line of weakness 30 comprises perforations around a majority of its length, with one corner being a die cut line of weakness, shown as die cut 38 in FIG. 1.

In the embodiment of foldunder label 10 shown in FIG. 1, second label 14 comprises an upper side and an opposing lower side (not shown in FIG. 1 but shown in FIG. 2), and first margin 40, second margin 42, and side margins 44, 46. Line of weakness 36 (such as, for example, perforations, die cut(s), and/or partial die cut(s)) is cut into second label 14 in a fashion that is inboard of the boundary formed by first margin 40, second margin 42, and side margins 44, 46. Line of weakness 36 does not intersect with any of first margin 40, second margin 42, and side margins 44, 46. Line of weakness 36 also is cut into second label 14 in a fashion that extends only into second label 14, but that does not extend into carrier material 16 underlying second label 14. Line of weakness 36 divides second label 14 into frame portion 32, which is outside line of weakness 36 (between line of weakness 36 and first margin 40, second margin 42, and side margins 44, 46), and a central portion 34, which is within line of weakness 36.

In at least one embodiment of foldunder label 10 according to the present disclosure, first label 12 and second label 14 are of identical or substantially identical length and width. In other words, the distance between first edge 22 and second edge 24 is identical to or substantially identical to the distance between first margin 40 and second margin 42. The distance between side edge 26 and side edge 28 also is identical to or substantially identical to the distance between side margin 44 and side margin 46. In at least one embodiment of foldunder label 10 according to the present disclosure, first label 12 and second label 14 are of different lengths and/or widths.

In at least one embodiment of the present disclosure, line of weakness 30 encompasses a larger area than does line of weakness 36. Therefore, in such an embodiment, the area of central region 20 is greater than the area of central portion 34.

As shown in FIG. 1, carrier material 16 comprises line of weakness 56, such as, for example, perforations, die cut(s), crease(s), and/or partial die cut(s). Line of weakness 56 is parallel to second edge 24 of first label 12 and parallel to first margin 40 of second label 14. Line of weakness 56 divides carrier material 16 into first section 66 and second section 68, and forms a line of demarcation between first section 66 and second section 68. In at least one embodiment of foldunder label 10 according to the present disclosure, line of weakness 56 is equidistant from second edge 24 and first margin 40. In at least one embodiment of foldunder label 10 according to the present disclosure, line of weakness 56 is not equidistant from second edge 24 and first margin 40.

Figure 2:
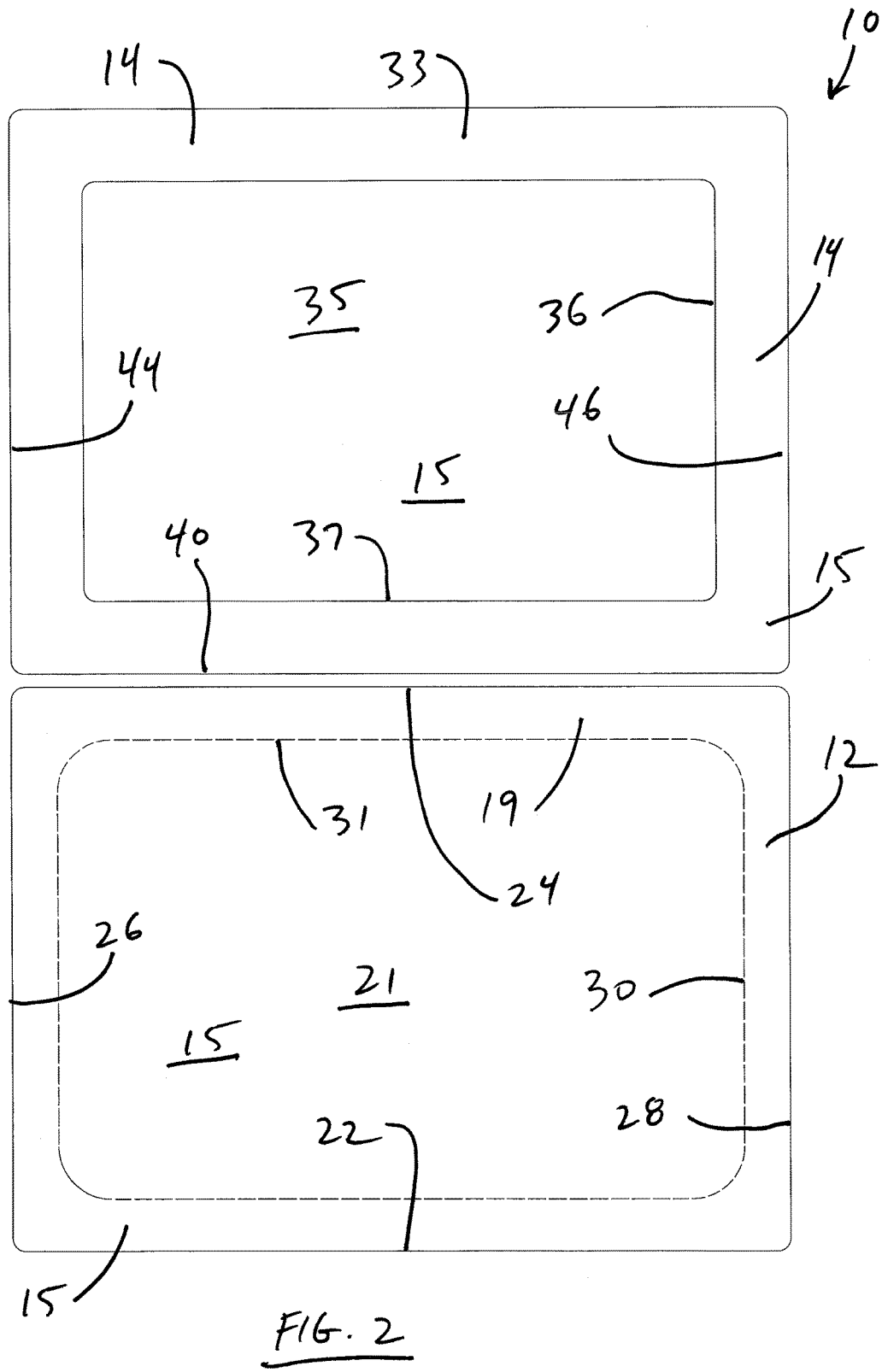
FIG. 2 shows a bottom view of a foldunder label according to at least one embodiment of the present disclosure.

FIG. 2 shows a bottom view of first label 12 and second label 14 according to at least one embodiment of the present disclosure, with carrier material 16 not shown for purposes of clarity. Shown in FIG. 2 is the underside of first label 12 along with first edge 22, second edge 24, and side edges 26, 28 of first label 12. Also shown in FIG. 2 is line of weakness 30. Line of weakness 30 divides the underside of first label 12 into frame region 19, which is outside line of weakness 30 (between line of weakness 30 and first edge 22, second edge 24, and side edges 26, 28), and a central region 21, which is within line of weakness 30. Frame region 19 is the opposing surface of frame region 18 that was shown in FIG. 1. Central region 21 is the opposing surface of central region 20 that was shown in FIG. 1. As shown in FIG. 2, adhesive 15 covers at least a portion of frame region 19 and central region 21. In at least one embodiment of the present disclosure, adhesive 15 covers all of frame region 19 and central region 21. In at least one embodiment of the present disclosure, adhesive 15 is provided in a pattern that covers less than all of frame region 19 and central region 21.

Also shown in FIG. 2 is the lower side of second label 14 along with first margin 40, second margin 42, side margins 44, 46, and line of weakness 36. Line of weakness 36 divides the lower side of second label 14 into frame portion 33, which is outside line of weakness 36 (between line of weakness 36 and first margin 40, second margin 42, and side margins 44, 46), and a central portion 35, which is within line of weakness 36. Frame portion 33 is the opposing surface of frame portion 32 that was shown in FIG. 1. Central portion 35 is the opposing surface of central portion 34 that was shown in FIG. 1. As shown in FIG. 2, adhesive 15 covers at least a portion of frame portion 32 and central portion 34. In at least one embodiment of the present disclosure, adhesive 15 covers all of frame portion 32 and central portion 34. In at least one embodiment of the present disclosure, adhesive 15 is provided in a pattern that covers less than all of frame portion 32 and central portion 34.

Figure 3:
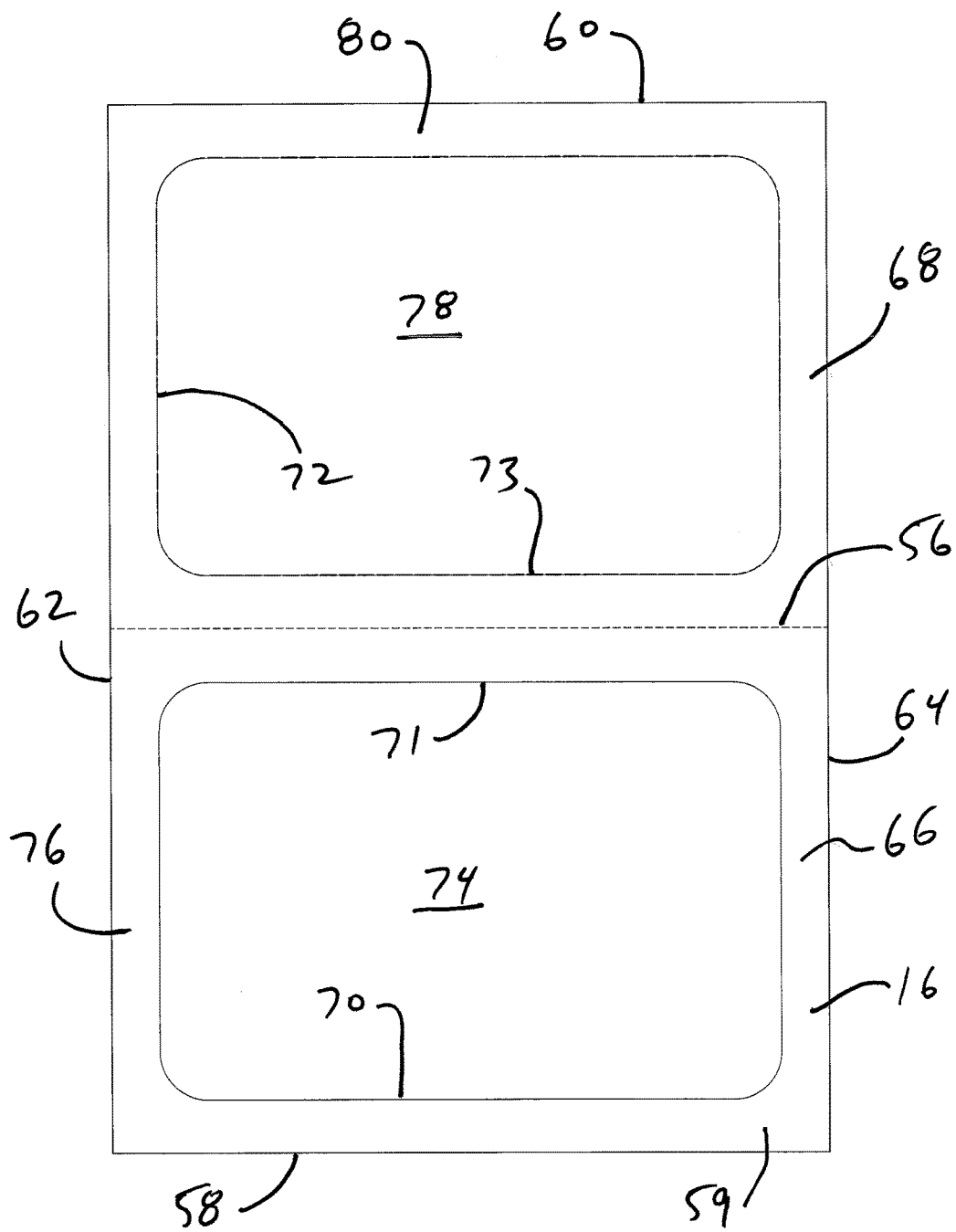
FIG. 3 shows a bottom view of a foldunder label according to at least one embodiment of the present disclosure.

FIG. 3 shows a bottom view of carrier material 16 according to at least one embodiment of the present disclosure. Shown in FIG. 2 is undersurface 59 of carrier material 16, comprising line of weakness 56 along with first section 66 and second section 68. In the embodiment of carrier material 16 shown in FIG. 3, undersurface 59 is free of any release coating material. Also shown in FIG. 2 is line of weakness 70 (such as, for example, perforations, die cut(s), and/or partial die cut(s)) in first section 66, and line of weakness 72 (such as, for example, perforations, die cut(s), and/or partial die cut(s)) in second section 68.

Line of weakness 70 is cut into carrier material 16 in a fashion that is inboard of the boundary formed by line of weakness 56, first boundary 58, and side boundaries 62, 64. Line of weakness 70 does not intersect with any of line of weakness 56, first boundary 58, and side boundaries 62, 64. Line of weakness 70 is cut into carrier material 16 in a fashion that extends only into carrier material 16, but that does not extend into first label 12. Line of weakness 70 divides first section 66 into frame zone 76, which is outside line of weakness 70, and a central zone 74, which is within line of weakness 70. In at least one embodiment of the present disclosure, line of weakness 30 is the same size and shape as line of weakness 70. In at least one embodiment of the present disclosure, when first label 12 is on carrier material 16, line of weakness 30 is in registration with line of weakness 70.

Line of weakness 72 is cut into carrier material 16 in a fashion that is inboard of the boundary formed by line of weakness 56, second boundary 60, and side boundaries 62, 64. Line of weakness 72 does not intersect with any of line of weakness 56, second boundary 60, and side boundaries 62, 64. Line of weakness 72 is cut into carrier material 16 in a fashion that extends only into carrier material 16, but that does not extend into second label 14. Line of weakness 72 divides second section 68 into frame part 80, which is outside line of weakness 72, and a central part 78, which is within line of weakness 72. When second label 14 is on carrier material 16, line of weakness 36 fits completely within line of weakness 72.

In at least one embodiment of the present disclosure, line of weakness 70 and line of weakness 72 are the same size and shape. Therefore, in such an embodiment of the present disclosure, the area within line of weakness 70 (central zone 74) and the area within line of weakness 72 (central part 78) are the same.

Line of weakness 70 comprises segment 71, which is the segment of line of weakness 70 closest to line of weakness 56. Segment 71 is parallel to line of weakness 56. Line of weakness 72 comprises segment 73, which is the segment of line of weakness 72 closest to line of weakness 56. Segment 73 is parallel to line of weakness 56 and, therefore, parallel to segment 71. In at least one embodiment of the present disclosure, the distance between segment 71 and line of weakness 56 is identical to the distance between segment 73 and line of weakness 56.

Figure 8:
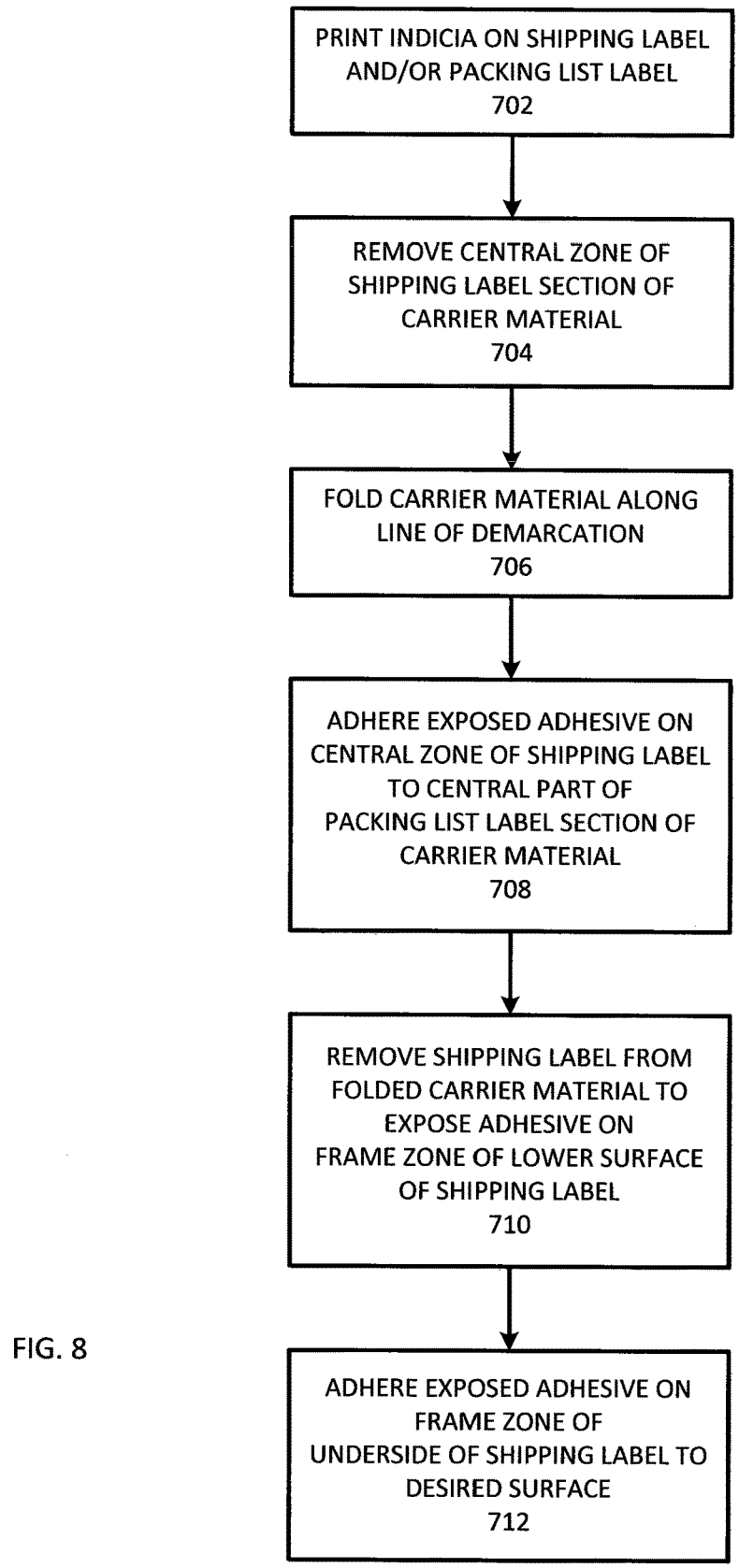
FIG. 8 shows a flow chart illustrating a use of a foldunder label according to at least one embodiment of the present disclosure.

FIG. 8 shows a flow chart illustrating a use of a foldunder label according to at least one embodiment of the present disclosure. According to at least one embodiment of the present disclosure, foldunder label 10 is used as follows. First, as shown in block 702 of FIG. 8, while first label 12 and second label 14 are on carrier material 16, the desired indicia (not shown) is printed on the top side of first label 12, and the desired indicia (not shown) is printed on the upper side of second label 14. The desired indicia may be printed anywhere on the top side of first label 12, but preferably is printed within central region 20. The desired indicia may be printed anywhere on the upper side of second label 14, but preferably is printed within central portion 34.

Figure 4:
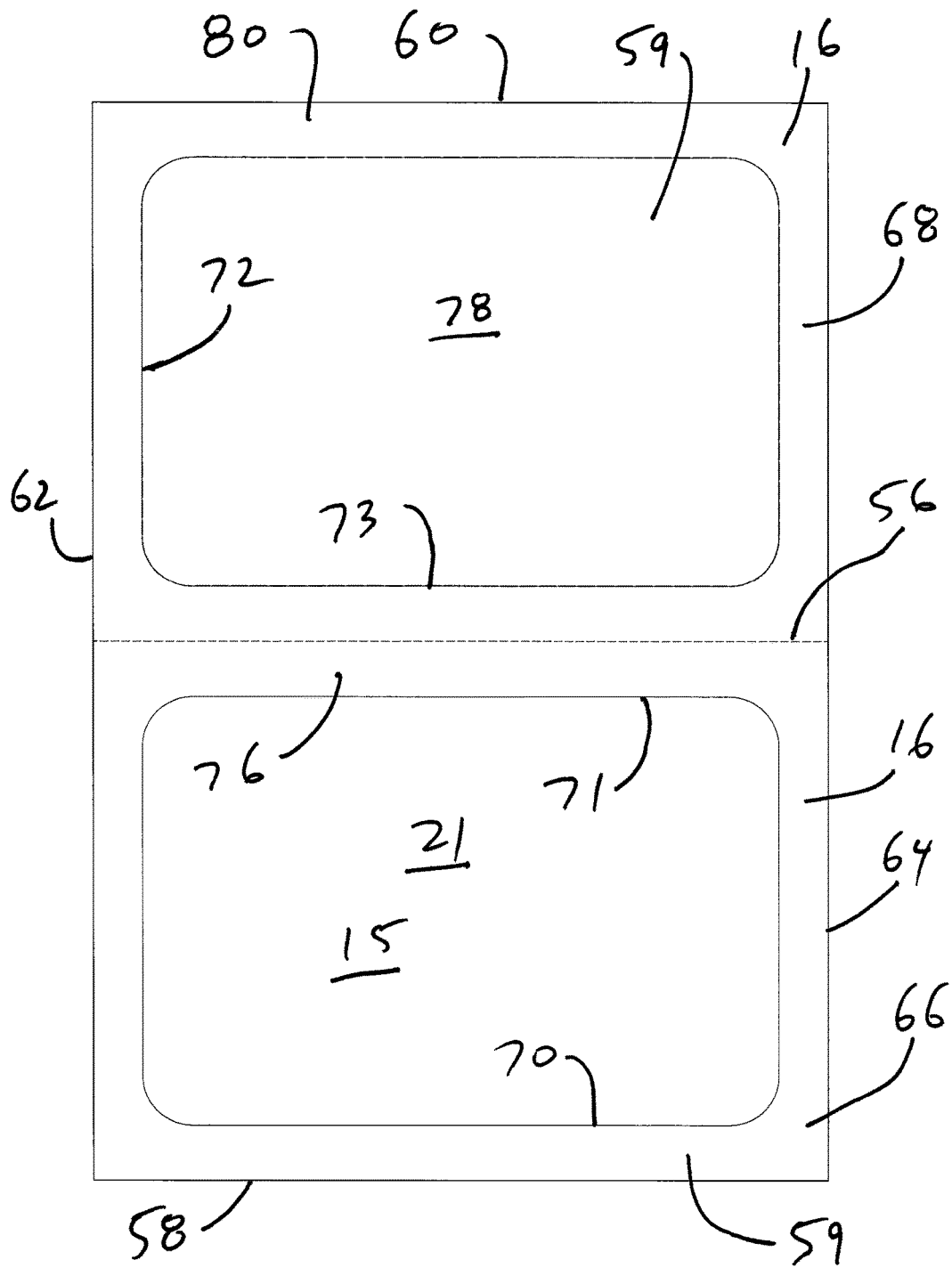
FIG. 4 shows a bottom view of a foldunder label according to at least one embodiment of the present disclosure.

As shown in block 704 of FIG. 8, after the desired indicia is printed on the top side of first label 12, and the desired indicia is printed on the upper side of second label 14, central zone 74 of first section 66 of carrier material 16 is removed, which reveals adhesive 15 on central region 21 of first label 12, as shown in FIG. 4.

Figure 5:
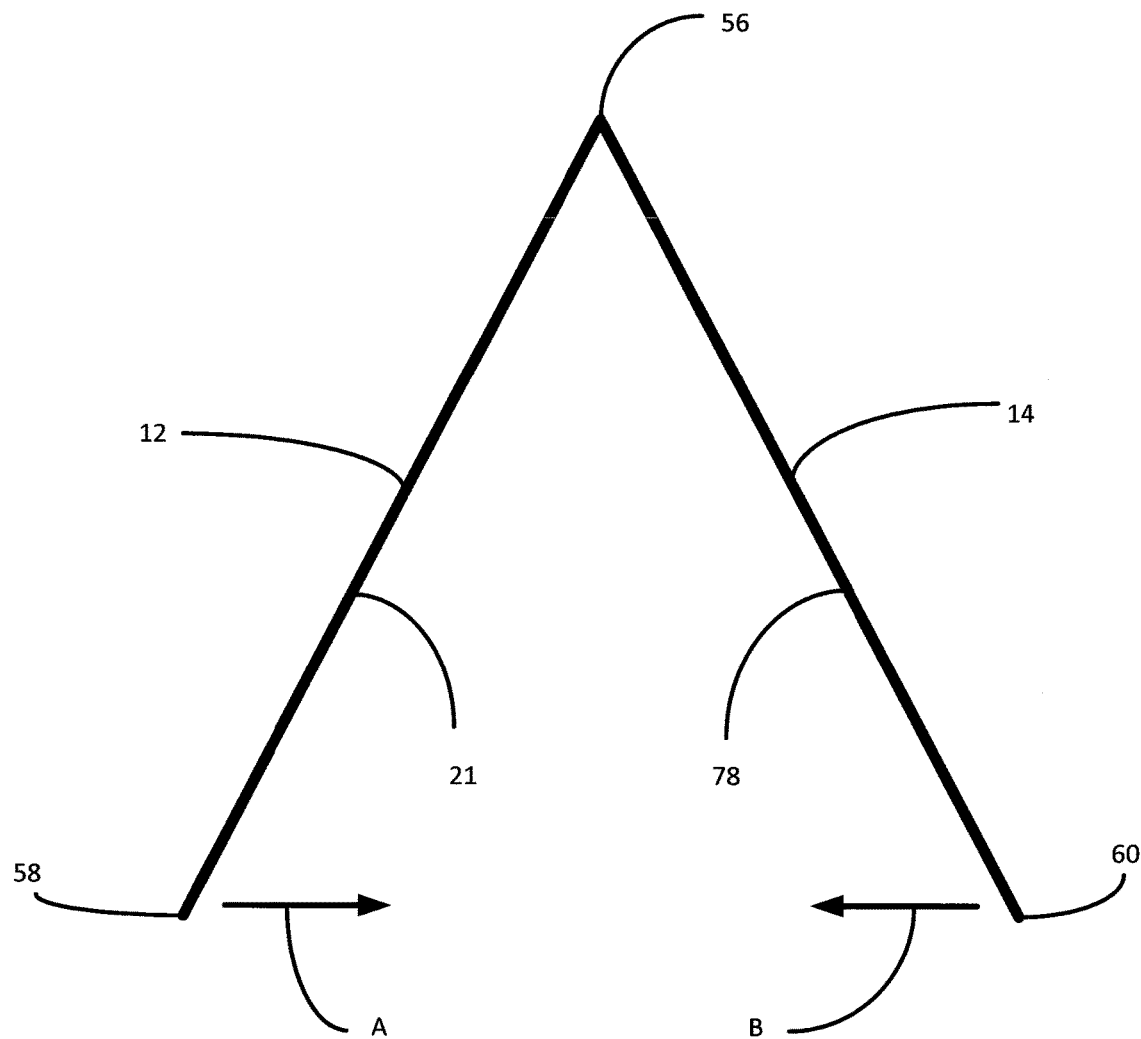
FIG. 5 shows an edge view of a foldunder label according to at least one embodiment of the present disclosure.

As shown in block 706 of FIG. 8, after central zone 74 of first section 66 of carrier material 16 is removed, carrier material is folded along line of weakness 56. In at least one embodiment, carrier material is folded along line of weakness 56 in the direction of arrows A and B as shown in FIG. 5, until the exposed adhesive 15 on central region 21 of first label 12 is brought into contact with and adhered to central part 78 of second section 68 of carrier material 16. Because there is no release coating on central part 78 of second section 68 of carrier material 16, central region 21 of first label 12 is securely adhered to central part 78 of second section 68 of carrier material 16, as shown in block 708 of FIG. 8. Because the line of weakness 56 is equidistant between segment 71 and segment 73, and because the area within line of weakness 70 and the area within line of weakness 72 are the same, after folding along line of weakness 56 and adhering central region 21 of first label 12 to central part 78 of second section 68 of carrier material 16, line of weakness 70 aligns with line of weakness 72. Therefore, because line of weakness 36 fits completely within line of weakness 72, after folding along line of weakness 56 and adhering central region 21 of first label 12 to central part 78 of second section 68 of carrier material 16, line of weakness 36 also fits completely within line of weakness 70. Further, because line of weakness 30 is in registration with line of weakness 70, after folding along line of weakness 56 and adhering central region 21 of first label 12 to central part 78 of second section 68 of carrier material 16, line of weakness 36 also fits completely within line of weakness 30. Finally, after folding along line of weakness 56 and adhering central region 21 of first label 12 to central part 78 of second section 68 of carrier material 16, central portion 34 of second label 14 fits inside the outer adhesive frame 19 of first label 12.

Figure 6:
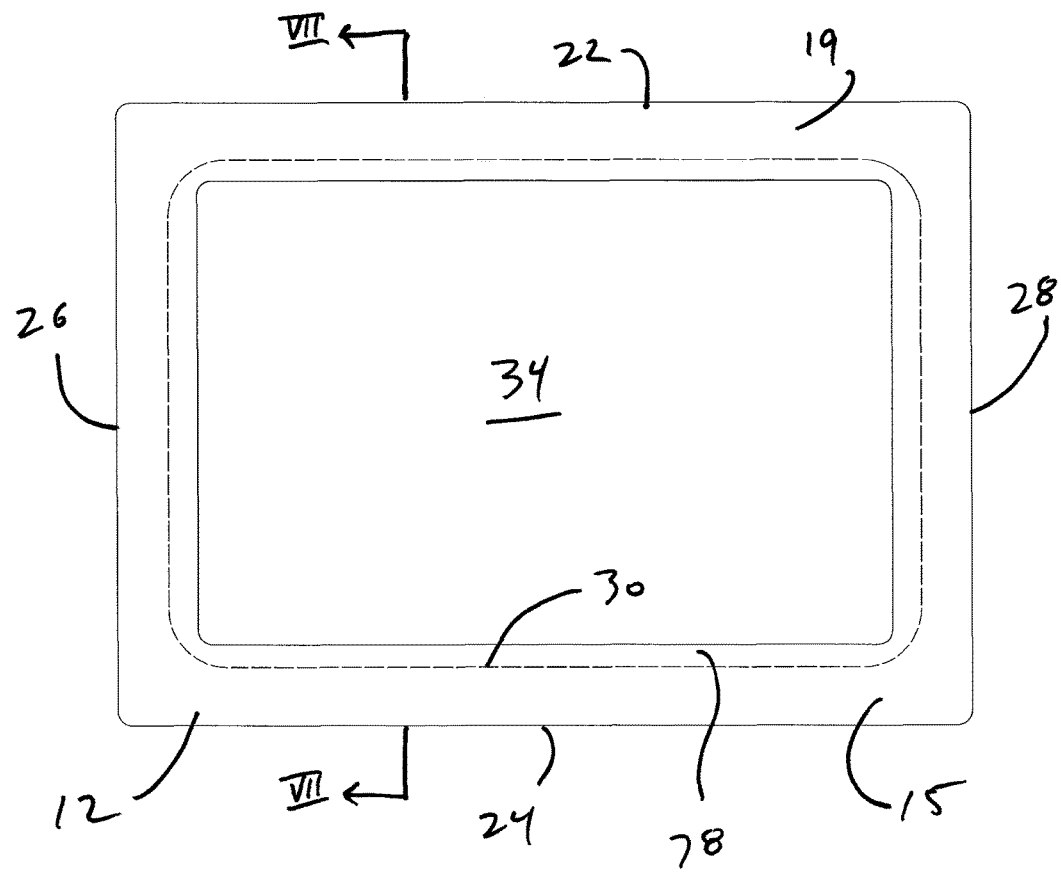
FIG. 6 shows a bottom view of a foldunder label according to at least one embodiment of the present disclosure.

As shown in block 710 of FIG. 8, after the steps of folding along line of weakness 56 and adhering central region 21 of first label 12 to central part 78 of second section 68 of carrier material 16, first label 14 is removed from folded carrier material 16, i.e., frame zone 76 of first section 66 of carrier material 16 and frame part 80 of second section 68 of carrier material 16 are removed. FIG. 6 shows a bottom view of first label 14 of foldunder label 10 after frame zone 76 of first section 66 of carrier material 16 and frame part 80 of second section 68 of carrier material 16 are removed. Shown in FIG. 6 is a bottom view of first label 14 bounded by first edge 22, second edge 24, and side edges 26, 28. Adhesive 15 on frame region 19 on the underside of first label 12 is exposed. Also shown in FIG. 6 is central portion 34 of second label 14, and a small portion of central part 78 of carrier material 16.

By removing first label 14 from folded carrier material 16, line of weakness 36 of second label 14 causes central portion 34 of second label 14 to separate from frame portion 32 of second label 14. Central portion 34 of second label 14 remains removably adhered to central part 78 of second section 68 of carrier material 16, which is already adhered to central region 21 of first label 12, thereby creating a first label with a removable center section 20 that has a peelable, full adhesive packing list (or other use) label (i.e., central portion 34 of second label 14) adhered to its underside, i.e., central region 21.

Figure 7:
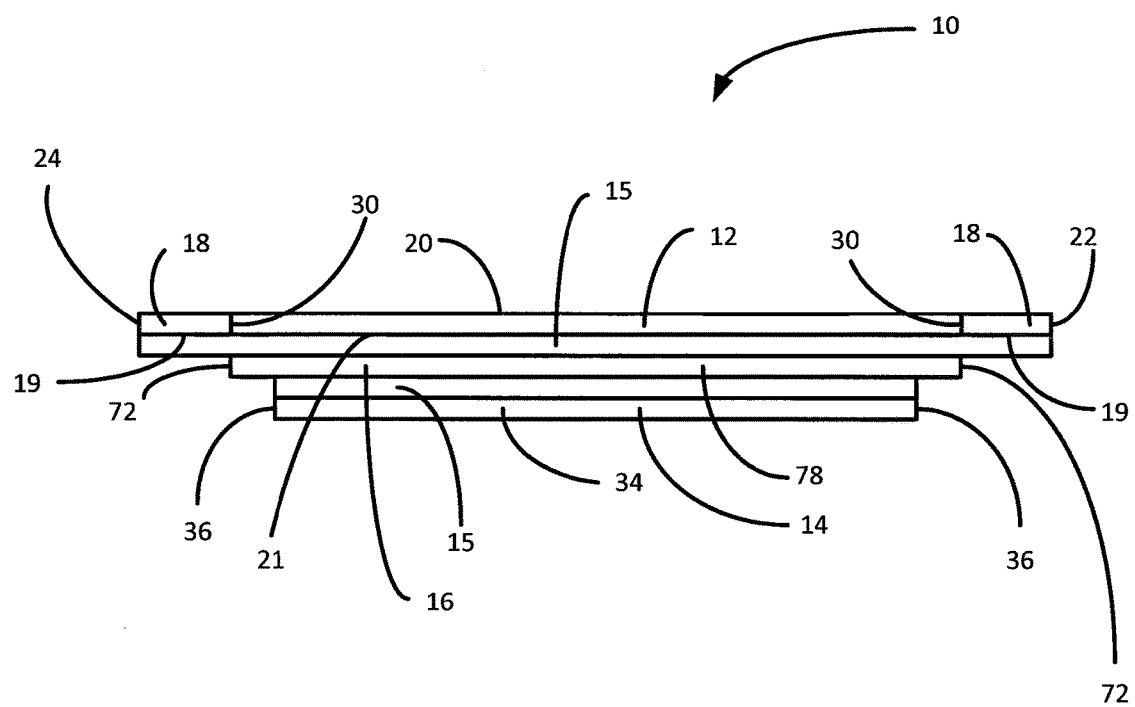
FIG. 7 shows a cross-sectional view of a foldunder label according to at least one embodiment of the present disclosure.

FIG. 7 shows a cross-section of foldunder label 10 from FIG. 6, with size and proportions enhanced for purposes of clarity. Shown in FIG. 7 is central portion 34 of second label 14. All of frame portion 32, i.e., all of second label 14 that was outside of line of weakness 36, has been removed. As shown in FIG. 7, central portion 34 of second label 14 is removably adhered to central part 78 of carrier material 16. All of frame part 80, i.e., all of second section 68 of carrier material 16 that was outside of line of weakness 72, also has been removed. As shown in FIG. 7, central part 78 of carrier material 16 is permanently adhered to central region 21 of first label 12 by adhesive 15. However, as shown in FIG. 7, adhesive 15 on frame region 19 on the underside of first label 12 is exposed. As shown in FIG. 7, when foldunder label 10 is folded as described herein, line of weakness 72 is in alignment with line of weakness 30. As shown in FIG. 7, all of first section 66 of carrier material 16 has been removed. Central zone 74 of first section 66 of carrier material 16 was removed in the step shown in block 704 of FIG. 8. Frame zone 76 of first section 66 of carrier material 16 was removed along with frame part 80 of second section 68 of carrier material 16 in the step shown in block 710 of FIG. 8.

Figure 9:
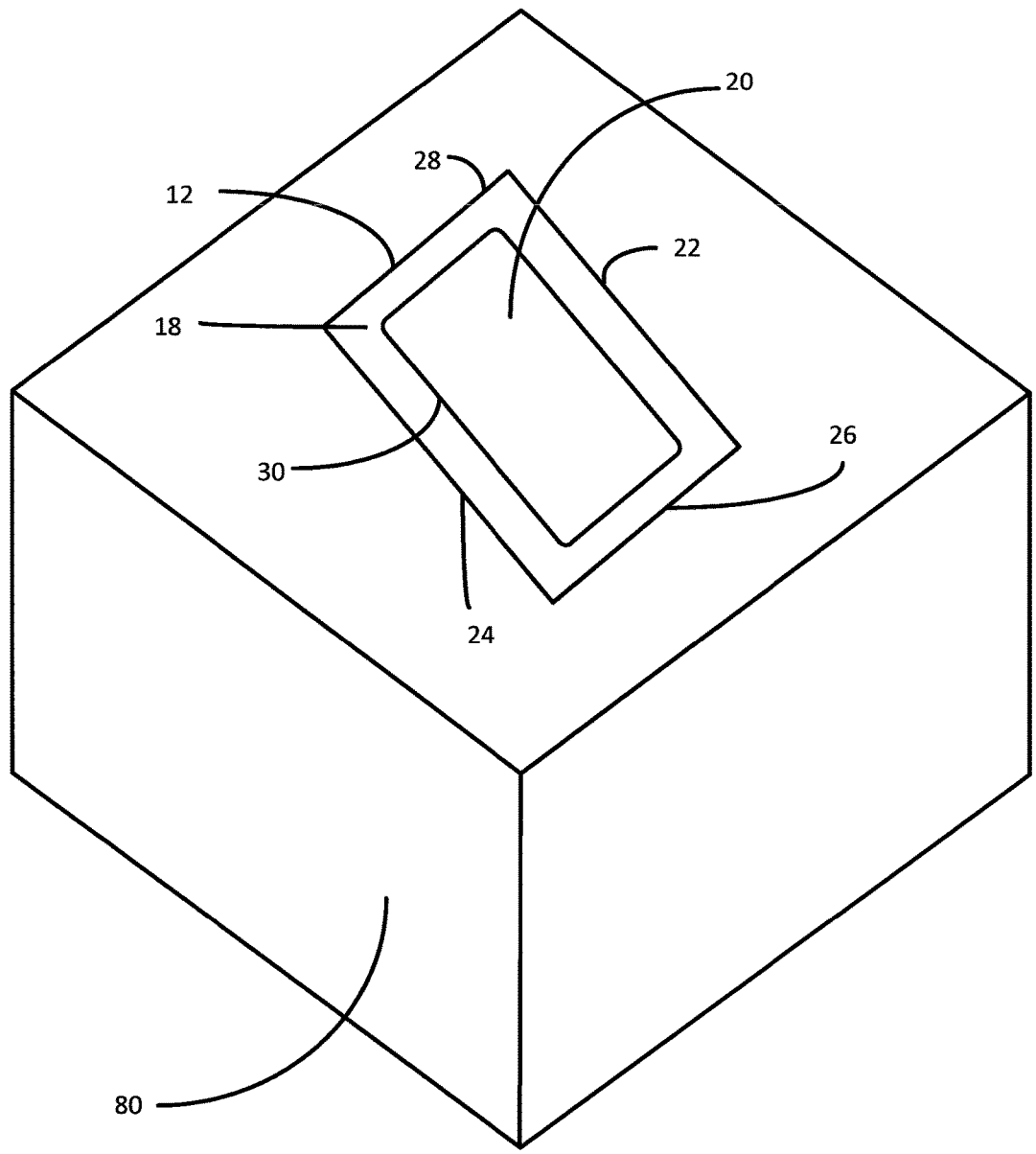
FIG. 9 shows a perspective view of a foldunder label according to at least one embodiment of the present disclosure.

As shown in block 712 of FIG. 8, first label 12 then can be adhered to a container or other surface to conceal the indicia on central portion 34 of second label 14, such as container 80 in FIG. 9. Later, central region 20 of first label 12 can be removed at line of weakness 30 to expose the indicia of central portion 34 of second label 14 adhered to its underside. Further, because central portion 34 of second label 14 is removably adhered to central part 78, central portion 34 of second label 14 may thereafter be removed from central part 78 and adhered to another surface by adhesive 15 thereon. In one nonlimiting example of a use of foldunder label 10, indicia on central region 20 of first label 12 may comprise shipping information, such as a recipient's address, and indicia on central portion 34 of second label 14 may comprise return information, such as the address of the sending party. If the recipient opens container 80 and determines that all or a portion of the contents thereof should be returned to the sending party, the recipient may remove central portion 34 of second label 14 from central part 78, adhere it to container 80, and then ship container 80 back to the sending party.

In at least one embodiment of the present disclosure, each foldunder label 10 is provided in a separate sheet. In at least one embodiment of the present disclosure, a plurality of foldunder labels 10 are connected in series, with one or more first boundaries 58 of foldunder labels 10 connected to one or more second boundaries 60 of adjacent foldunder labels 10. In at least one embodiment of the present disclosure, the plurality of serially connected foldunder labels 10 is arranged into a roll of foldunder labels 10. In at least one embodiment of the present disclosure, the plurality of serially connected foldunder labels 10 is fan folded into a stack of foldunder labels 10. In at least one embodiment where a plurality of foldunder labels 10 are connected in series, perforations or other lines of weakness separate each of the plurality of foldunder labels 10 from the adjacent foldunder labels 10. Such perforations or other lines of weakness form first boundary 58 and second boundaries 60 of each foldunder label 10.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A foldunder label comprising:
    a first label sheet comprising a top side and an opposing underside, said first label sheet comprising a first label line of weakness, said first label line of weakness defining a central region of said first label sheet, said central region having a first area;
    a second label sheet comprising an upper side and an opposing lower side, said second label sheet comprising a second label line of weakness, said second label line of weakness defining a central portion of said second label sheet, said central portion having a second area, wherein said first area is larger than said second area; and
    a carrier material comprising a first section and a second section separated by a line of demarcation, wherein said underside of said first label sheet is removably adhered to said first section and said lower side of said second label sheet is removably adhered to said second section, said carrier material further comprising a first section line of weakness underlying said first label, and a second section line of weakness underlying said second label.

2. The foldunder label of claim 1, wherein said first section and said second section have substantially the same dimensions.

3. The foldunder label of claim 1, wherein said carrier material is foldable at said line of demarcation.

4. The foldunder label of claim 1, wherein said second label sheet further comprises a first margin, a second margin, and at least two side margins, said first margin, said second margin, and side margins together forming a second label sheet border, said second label line of weakness being inboard of said second label sheet border, said second label line of weakness dividing said second label sheet into said central portion within said second label line of weakness and a frame portion between said second label line of weakness and said second label sheet border.

5. The foldunder label of claim 1, wherein said first label sheet further comprises a first edge, a second edge, and at least two side edges, said first edge, said second edge, and side edges together forming a first label sheet border, said first label line of weakness being inboard of said first label sheet border, said first label line of weakness dividing said first label sheet into said central region within said first label line of weakness and a frame region between said first label line of weakness and said first label sheet border.

6. The foldunder label of claim 1, wherein said first section line of weakness is identical in size and shape to said first label line of weakness.

7. The foldunder label of claim 1, wherein said first section line of weakness is in registration with said first label line of weakness.

8. The foldunder label of claim 1, wherein said first section line of weakness is identical in size and shape to said second section line of weakness.

9. The foldunder label of claim 1, wherein said first section line of weakness, said second section line of weakness, and said first label line of weakness all are identical in size and shape.

10. A method of assembling a foldunder label, the method comprising the steps of:
    providing an unassembled foldunder label, the unassembled foldunder label comprising a first label sheet comprising a top side and an opposing underside, said first label sheet comprising a first label line of weakness, said first label line of weakness defining a central region of said first label sheet, a second label sheet comprising an upper side and an opposing lower side, said second label sheet comprising a second label line of weakness, said second label line of weakness defining a central portion of said second label sheet, and a carrier material comprising a first section and a second section separated by a line of demarcation, wherein said underside of said first label sheet is removably adhered to said first section and said lower side of said second label sheet is removably adhered to said second section, said carrier material further comprising a first section line of weakness underlying said first label, said first section line of weakness dividing said first section into a central zone within said first section line of weakness and a frame zone outside of said first section line of weakness, and a second section line of weakness underlying said second label, said second section line of weakness dividing said second section into a central part within said second section line of weakness and a frame part outside of said second section line of weakness;

removing said central zone of said first section, thereby exposing an adhesive on said underside of said first label sheet;

folding said carrier material at said line of demarcation;

adhering said exposed adhesive of said underside of said first label sheet to said central part of said second section; and removing said first label from said folded carrier material to expose said adhesive on said frame zone of said underside of said first label.

11. A foldunder label comprising:

a first label sheet comprising a top side and an opposing underside, said first label sheet comprising a first label line of weakness, said first label line of weakness defining a central region of said first label sheet;

a second label sheet comprising an upper side and an opposing lower side, said second label sheet comprising a second label line of weakness, said second label line of weakness defining a central portion of said second label sheet; and a carrier material comprising a first section and a second section separated by a line of demarcation, wherein said underside of said first label sheet is removably adhered to said first section and said lower side of said second label sheet is removably adhered to said second section, said first section comprising a frame zone defining an open central zone within said frame zone, said underside of said first label overlying at least a portion of said open central zone and at least a portion of said frame zone, said second section comprising a second section line of weakness underlying said second label, said second section line of weakness dividing said second section into a central part within said second section line of weakness and a frame part outside of said second section line of weakness, said carrier material folded at said line of demarcation so that at least a segment of said underside of said first label sheet overlying said open central zone is adjacent to said central part of said second section.

12. The foldunder label of claim 11, wherein said first section and said second section have substantially the same dimensions.

13. The foldunder label of claim 11, wherein said second label sheet further comprises a first margin, a second margin, and at least two side margins, said first margin, said second margin, and side margins together forming a second label sheet border, said second label line of weakness being inboard of said second label sheet border, said second label line of weakness dividing said second label sheet into said central portion within said second label line of weakness and a frame portion between said second label line of weakness and said second label sheet border.

14. The foldunder label of claim 11, wherein said first label sheet further comprises a first edge, a second edge, and at least two side edges, said first edge, said second edge, and side edges together forming a first label sheet border, said first label line of weakness being inboard of said first label sheet border, said first label line of weakness dividing said first label sheet into said central region within said first label line of weakness and a frame region between said first label line of weakness and said first label sheet border.

15. The foldunder label of claim 11, wherein said central zone of said first label sheet is identical in size and shape to said first label line of weakness.

16. The foldunder label of claim 11, wherein said central zone of said first label sheet is in registration with said first label line of weakness.

17. The foldunder label of claim 11, wherein said central zone of said first label sheet is identical in size and shape to said second section line of weakness.

18. The foldunder label of claim 11, wherein said central zone of said first label sheet, said second section line of weakness, and said first label line of weakness all are identical in size and shape.

* * * * *